United States Patent
Lecomte et al.

(10) Patent No.: US 9,867,233 B2
(45) Date of Patent: Jan. 9, 2018

(54) VITROCERAMIC ARTICLE WITH LUMINOUS DISPLAY

(71) Applicant: EUROKERA S.N.C., Chateau-Thierry (FR)

(72) Inventors: Emmanuel Lecomte, Nesles la Montagne (FR); Nicolas Aulagnon, Mezy Moulins (FR); Pablo Vilato, Paris (FR)

(73) Assignee: EUROKERA S.N.C., Chateau-Thierry (FR)

( * ) Notice: Subject to any disclaimer, the term of this patent is extended or adjusted under 35 U.S.C. 154(b) by 225 days.

(21) Appl. No.: 14/647,616

(22) PCT Filed: Dec. 2, 2013

(86) PCT No.: PCT/FR2013/052909
§ 371 (c)(1),
(2) Date: May 27, 2015

(87) PCT Pub. No.: WO2014/096599
PCT Pub. Date: Jun. 26, 2014

(65) Prior Publication Data
US 2015/0327333 A1    Nov. 12, 2015

(30) Foreign Application Priority Data

Dec. 21, 2012 (FR) .................... 12 62584

(51) Int. Cl.
| H05B 3/68 | (2006.01) |
| H05B 3/74 | (2006.01) |
| F24C 3/12 | (2006.01) |
| C03C 3/091 | (2006.01) |
| C03C 8/14 | (2006.01) |
| C03C 17/00 | (2006.01) |
| F24C 15/10 | (2006.01) |

(52) U.S. Cl.
CPC ............. *H05B 3/742* (2013.01); *C03C 3/091* (2013.01); *C03C 8/14* (2013.01); *C03C 17/007* (2013.01); *F24C 3/126* (2013.01); *F24C 15/102* (2013.01); *C03C 2217/452* (2013.01); *C03C 2217/485* (2013.01); *C03C 2217/72* (2013.01); *C03C 2218/119* (2013.01); *C03C 2218/34* (2013.01)

(58) Field of Classification Search
CPC ....... H05B 3/742; C03C 3/091; C03C 17/007; C03C 17/041; C03C 17/361; C03C 17/3605; C03C 17/3673; C03C 17/3681; C03C 2217/452; C03C 2217/485; C03C 2217/72; C03C 2218/119; C03C 2218/34; C03C 8/14; C03C 8/02; F24C 3/126; F24C 15/102

See application file for complete search history.

(56) References Cited

U.S. PATENT DOCUMENTS

| 5,326,728 | A | 7/1994 | Boury et al. |
| 6,043,171 | A | 3/2000 | Siebers et al. |
| 6,517,943 | B1 | 2/2003 | Beunet et al. |
| 6,525,300 | B1 | 2/2003 | Mitra et al. |
| 2010/0009837 | A1 | 1/2010 | Sakoske |
| 2010/0273631 | A1* | 10/2010 | Pelletier .................. C03C 3/085 501/26 |
| 2011/0277505 | A1 | 11/2011 | Sakoske |
| 2014/0146538 | A1 | 5/2014 | Zenker et al. |
| 2014/0153234 | A1 | 6/2014 | Knoche et al. |
| 2014/0193627 | A1 | 7/2014 | Pelletier et al. |

FOREIGN PATENT DOCUMENTS

| DE | 197 21 737 | 11/1998 |
| DE | 10 2011 050 870 | 12/2012 |
| FR | 2 782 318 | 2/2000 |
| FR | 2 926 544 | 7/2009 |

OTHER PUBLICATIONS

International Search Report Issued Aug. 5, 2014 in PCT/FR2013/052909 dated Dec. 2, 2013.

* cited by examiner

*Primary Examiner* — Shawntina Fuqua
(74) *Attorney, Agent, or Firm* — Oblon, McClelland, Maier & Neustadt, L.L.P.

(57) ABSTRACT

The present invention relates to a vitroceramic article intended in particular to cover or receive heating elements, said article being provided with at least one luminous zone, in particular for display, comprising at least one luminous pattern, said article comprising at least one vitroceramic substrate, at least one light source, and at least one enamel coating which covers at least a part of said zone and within which an uncovered region is formed in the shape of said pattern, the composition of said enamel comprising at least one glass frit and at least one pigment, the glass frit comprising the following constituents:

| $SiO_2$ | 40-55% |
| $Al_2O_3$ | 0-10% |
| $B_2O_3$ | 25-55% |
| $Na_2O$ | 0-5% |
| $K_2O$ | 0-5% |
| $Li_2O$ | 0-10%, | the rate of pigment or pigments being from 40 to 65% by weight of the frit/pigment mixture, the article furthermore comprising a diffusing zone facing the enamel coating.

17 Claims, No Drawings

VITROCERAMIC ARTICLE WITH LUMINOUS DISPLAY

The present invention relates to the field of vitroceramics (or "glass-ceramics"). More precisely, it relates to a vitroceramic article (or product or substrate), in particular a vitroceramic plate, intended in particular to cover or receive heating elements, said article being provided with a luminous display (or at least one luminous zone) in at least one selected zone of the article.

BACKGROUND OF THE INVENTION

The sales of articles such as vitroceramic cooking plates (or hobs) have been increasing constantly for several years. This success is explained, in particular, by the attractive appearance of these plates and the ease with which they can be cleaned.

It may be recalled that a vitroceramic is based on glass, referred to as precursor glass (or mother glass or green glass), the specific chemical composition of which makes it possible to induce controlled crystallization by suitable heat treatments, referred to as ceramization. This partly crystallized specific structure imparts unique properties to the vitroceramic.

There are currently various types of vitroceramic plates, each variant being the result of significant studies and numerous tests, given that it is very difficult to make modifications to these plates and/or the method by which they are obtained without risking an unfavorable effect on the desired properties: in order to be used as a cooking plate, a vitroceramic plate must generally exhibit transmission in the visible wavelength range which is both low enough to mask at least some of the underlying heating elements when off and high enough so that, depending on the case (radiant heating, induction heating, etc.), the user can visually detect the heating elements which are on with a view to safety; it must also exhibit high transmission in the infrared wavelength range, particularly in the case of plates with radiant heat sources.

Most contemporary plates are dark in color, in particular black, colored for example by using vanadium oxide added to the starting materials of the mother glass before melting; after ceramization, this oxide imparts a strong orange brown tint associated with reduction of the vanadium. Other colorants may also be used, such as the oxides of cobalt and manganese. With a low transmission coefficient below 600 nm, these plates make it possible above all to see red elements as heating elements heated to high temperature, or alternatively luminous displays based on red-colored monochromatic light-emitting diodes. There are also more transparent vitroceramic plates (such as the vitroceramics KeraVision or KeraResin, marketed by the company EuroKera), or other plates (such as the Keraspectrum vitroceramics), making it possible to display other colors.

The luminous illumination used with vitroceramic plates can make it possible to indicate controls or heating zones, to display data, to show decorations, etc. The light sources used are generally installed below the plate, in such a way that they can illuminate patterns (for example an icon or a symbol indicating that the heating zones are on, or an ON/OFF pattern), generally deposited by screen printing on the upper face of the vitroceramic. In general, it is desirable for these patterns, which are generally small, to appear with sufficient clarity and contrast and for them to be easily locatable, whether they are in the activated state (lit) or the deactivated state (off).

It is known to deposit patterns, intended to be illuminated, by screen printing with the same type of enamel as that conventionally used for the cooking plate decorations on the upper face of the vitroceramic, for example an enamel comprising 70% by weight of glass frit and 30% by weight of black pigments, the glass frit being in particular based on silicon dioxide $SiO_2$ (present for example at 42% by weight of the frit), boron trioxide $B_2O_3$ (for example at 28% by weight), and aluminum oxide $Al_2O_3$ (for example at 18% by weight). However, when the light source arranged on the lower face of the vitroceramic is lit (emitting for example red light), the contours delimited by the screen-printed enamel may not appear sharp because the light diffuses through the enamel, thus degrading the definition of the pattern represented. The points on the lower face of the vitroceramic may furthermore be visible in the patterns by transparency, and may induce optical distortion of the light of the light source.

One way of overcoming these problems consists, in particular, in depositing black paint by screen printing on the lower face of the plate, facing the pattern of the upper face. It is also possible for a resin with the same refractive index as the vitroceramic to be combined with the black paint in order to limit the effect of the optical distortion due to the points. However, alignment of the enamel-based pattern screen-printed onto the upper face of the vitroceramic with the paint-based pattern screen-printed onto the lower face of the vitroceramic, this alignment being necessary in order to obtain the desired results, is very difficult to carry out industrially.

BRIEF SUMMARY OF THE INVENTION

The present invention has therefore sought a solution which is simple to carry out and effective, making it possible to preserve sharpness of the contours of the luminous patterns (that is to say ones intended to be illuminated) appearing on the upper face of the vitroceramic, when said patterns are illuminated by one or more light sources (in particular located on the lower face of the vitroceramic), in a similar way to that which is observed without illumination, this solution also making it possible to clearly identify the patterns in the inactive state and prevent visibility of the points located on the lower face of the vitroceramic, as well as the distortion effect induced by these points.

This object is achieved by the vitroceramic article (or product), in particular the vitroceramic plate, according to the invention, intended in particular to cover or receive heating elements (the article according to the invention being, in particular, a cooking plate or hob), said article being provided with at least one zone (designed to be) luminous (or zone intended to be illuminated), in particular a zone for displaying information (for example a zone indicating by a symbol or icon, by words, etc., whether one or more heating zones are on or off, or ON/OFF zone), comprising at least one luminous pattern, said article comprising at least one vitroceramic substrate, at least one light source (intended and placed in such a way as to illuminate the pattern, this source being in particular placed below the lower face of the substrate), in particular at least one light-emitting diode, and at least one enamel coating which covers at least a part of said zone (the enamel being deposited in particular on the upper face of the substrate, particularly by screen printing) and within which an uncovered region is formed in the shape of said pattern, the composition of said enamel comprising at least one glass frit and at least one pigment, and optionally at least one vehicle or medium, said glass frit having the following composition (or comprising the following constituents within the ranges defined below, limits included), the proportions being expressed as percentages by weight (weight percentages or mass percentages, expressed in terms of the total weight of the frit):

| | |
|---|---|
| $SiO_2$ | 40-55% |
| $Al_2O_3$ | 0-10% |
| $B_2O_3$ | 25-55% |
| $Na_2O$ | 0-5% |
| $K_2O$ | 0-5% |
| $Li_2O$ | 0-10%, | the rate of pigment or pigments further being from 40 to 65% by weight of the frit/pigment mixture (and preferably from 45 to 60% by weight), the article furthermore comprising a diffusing zone facing said enamel coating.

DETAILED DESCRIPTION OF THE INVENTION

According to the present invention, therefore, in order to define the patterns for luminous use, intended for example to display information or controls on vitroceramics, such as cooking plates, an enamel which is formed by a frit of a particular composition, not known for the coating of such plates, and furthermore having a rate of pigments higher than that of the enamels conventionally used, is deposited, in particular by screen printing, on a surface (or zone), particularly on the upper face of the vitroceramic, which is intended to incorporate the desired pattern, this pattern being obtained by forming an uncovered region of the corresponding shape in the enamel coating deposited, and this coating on one face of the substrate is combined with a diffusing zone facing the enameled coating, in particular between the enameled coating and the light source intended to illuminate it, and in particular on the opposite face of the substrate (in particular on/under the lower face), this diffusing zone being, in particular, of the same shape and/or size (or approximately the same shape and/or size) as the enameled coating, without it then being necessary to align the two zones perfectly, the combination formed in this way having the effect that the light emitted by the light source, concentrated in the pattern, diffuses only into the uncovered region, and that the contours of the pattern obtained are particularly sharp, without thereby making points or elements lying below the pattern perceptible.

The enamel as defined, applied onto the upper face of a black vitroceramic, has an opacity in the unilluminated state comparable with that of a traditional enamel for coating cooking plates, and, when the enamel is exposed to the light, in particular red light, used to illuminate the relevant zones of the vitroceramic, has an opacity much greater than that of the traditional enamels for cooking plates, the screen printing of a black paint on the lower face of the vitroceramic being superfluous in this case.

The enamel can be deposited easily, in particular by screen printing, or alternatively by a transfer process or an enamel jet, and it makes it possible to obtain an opaque thin layer (advantageously from 1 to 6 microns after firing, in particular from 2 to 5 microns), without cracking or blistering (the composition having, in particular, a low expansion coefficient). The glass frit is compatible with deposition in a small thickness, and permits a pigment(s) rate in the enamel compatible with the desired masking effect (preferably for screen printing with a thickness of from 2 to 5 microns after firing) without cracking or disaggregation of the enamel deposited on the glass substrate. The viscosity of the enamel composition furthermore allows good spreading, ensuring a relatively bright and smooth appearance of the enamel in the final product, the layer obtained having good mechanical strength. The enamel may advantageously be fired (subsequently) on the ceramized substrate, at temperatures of the order of from 700 to 800° C. which are generally used for heat treatment of the enamel, without risk of optical dispersion, or it may advantageously be deposited on a precursor glass (or mother glass) before ceramization and be fired during the ceramization.

The enamel advantageously has the composition defined according to the invention. It is in particular formed (before application onto the substrate and firing) by a powder comprising a glass frit (or glass particles, which will form a vitreous matrix) and pigments (in particular as colorants; these pigments may optionally form part of the frit), the frit and the pigments being based on metal oxides, and a medium or "vehicle" allowing application and preliminary adhesion of the enamel on the substrate.

Preferably, the glass frit of the enamel composition comprises a rate of $SiO_2$ ranging from 45 to 50%, and/or a rate of $Al_2O_3$ ranging from 2 to 8%, advantageously from 3 to 6%, and/or a rate of $B_2O_3$ ranging from 27 to 50%, advantageously from 27 to 45%, in which case this rate may be more than 30%, in particular more than 31%, or more than 32%, or even and advantageously more than 33%, and in particular more than 34%.

Also preferably, the glass frit comprises a rate of $Na_2O$ ranging from 2 to 3%, and/or a rate of $K_2O$ ranging from 0.5 to 3%, advantageously from 1 to 2%, and/or a rate of $Li_2O$ ranging from 2 to 6%, advantageously from 3 to 5%.

Also preferably, the enamel composition is free of at least one of the following elements: $ZrO_2$, BaO, MgO, CaO and SrO, in order to have good properties in terms of secure handling and viscosity, etc. Furthermore, when the enamel comprises $TiO_2$, its rate in the frit is less than 5%, advantageously less than 2%, or even less than 1% by weight.

Preferably, the glass frit of the selected enamel composition consists of:

| | |
|---|---|
| $SiO_2$ | 45-50% |
| $Al_2O_3$ | 2-8%, advantageously 3-6% |
| $B_2O_3$ | 27-50%, advantageously 27-45% |
| $Na_2O$ | 2-3% |
| $K_2O$ | 0.5-3%, advantageously 1-2% |
| $Li_2O$ | 2-6%, advantageously 3-5%. |

Besides the glass frit (or glass particles) with the composition explained above, the enamel defined according to the invention may also comprise other components. The enamel according to the invention comprises, in particular, at least some pigments as already indicated above, the rate of pigment or pigments, which are generally added to the frit, in the total frit(s)/pigment(s) of the enamel generally being between 40 and 65% by weight (limits included), and preferably between 45 and 60%, expressed in terms of the total frit(s)/pigment(s). The pigments may, in particular, be selected (in particular as a function of the desired coloration) from among compounds containing metal oxides such as chromium oxides, copper oxides, iron oxides, cobalt oxides, nickel oxides, zinc oxides, manganese oxides, cerium oxides, titanium oxides, or based on aluminum, etc., and/or they may be selected from among copper chromates, cobalt chromates, etc.

The enamel defined according to the invention preferably comprises at least one opaque black pigment, for example based on oxides of chromium, iron, cobalt and nickel, or chromium and copper Cr—Cu spinels (such as the black pigments marketed by the company Ferro™ under the reference spinel V7709, or by the company Sheperd Colors under the reference BK1G, etc.). The enamel may also advantageously comprise pigments based on $MnO_2$, $Fe_2O_3$ and/or CoO, or alternatively pigments (colors) based on: NiO (green), $Cr_2O_3$ (green), $TiO_2$ (white), Cr—Al spinel (pink), Sn—Sb—V (gray), Ti—Sb—Ni (yellow), Zr—V (yellow), Co—Zn—Al spinel (blue), Zn—Fe—Cr spinel (brown), silicates such as Ca—Cr—Si garnet (green), Ca—Sn—Si—Cr (pink), zircon Zr—Si—Fe (pink), Co—Zn—Si (dark blue), and/or Co—Si (dark blue), etc.

The glass frit and the pigments are generally in the form of a powder before being put into suspension in a medium. The particle size distribution of the total frit(s)/pigment(s) in powder form is generally selected so that at least 90% by weight of the particles forming the powder have a diameter of less than 20 μm, in particular less than 10 μm. Preferably, the glass frit and the pigment or pigments are formed by particles having a particle size distribution ranging from 1 to 6 microns, this enamel, with a rate of pigment or pigments of from 40 to 65%, preferably from 45 to 60%, in particular about 50%, making it possible to obtain sufficient opacity without having to present too great a thickness, thus limiting the difference in expansion coefficient between the substrate and the enamel, which contributes to avoiding cracking (blistering of the enamel layer while it is being cooled).

The glass frit may, in particular, be obtained by melting at high temperature (more than 1000° C.) a mixture of suitable (natural or synthetic) starting materials. The frit is then ground (for example to about 10-13 microns) and/or microground (or attrited, for example to around 3-4 microns), generally in a solvent such as ethanol (which is subsequently evaporated), in order to obtain in particular a powder, the pigments optionally being added to this powder. The powder mixture (glass powder+pigments) resulting therefrom (after evaporation of the grinding solvent, where appropriate) is subsequently put into suspension in a medium in order to obtain a composition (paste) which can be deposited on a substrate.

The enamel composition in its form ready for deposition generally comprises a medium making it possible to adjust the desired viscosity for application onto the substrate and making it possible to bind with the substrate. This medium, which is selected in order to ensure good suspension of the particles of the frits and pigments and which will later be consumed during the firing of the enamel, may be any organic medium or binder normally used in traditional enamel compositions, and may in particular comprise solvents, diluents, oils such as pine oils and other plant oils, resins such as acrylic resins, petroleum fractions, film-forming materials such as cellulosic materials, etc., the proportion of medium in the composition ready to be deposited preferably being between 40 and 60% by weight of said composition, preferably between 45 and 55% by weight.

The enamel composition before deposition onto the vitroceramic article according to the invention, such as a plate, is therefore generally in the form of a stable liquid/solid mixture of paste-like consistency, with a viscosity suited to the method of deposition (in particular by screen printing).

The uncovered region (part not covered by the enamel within the enameled coating) is formed, for example, by masking the zone or zones in question during the deposition of the enamel composition, with the aid of a mask which is removed after the deposition, or for example by blocking the cells of the screen-printing screen used for deposition of the enamel in the zone or zones in question, or by precisely targeting the zones to be covered with the enamel jet, etc.

As indicated in the definition of the invention, the article according to the invention also comprises at least one diffusing zone (or light diffuser) facing the enamel coating, the light emitted by the light source or sources passing through this diffusing zone before reaching the pattern to be illuminated. This diffuser is generally located on the lower face of the vitroceramic. This diffusing zone makes it possible, in particular, to extract the radiation emitted by the source or sources toward the desired illumination zone, and is formed for example by one or more diffusing elements or treatments, and particularly is in the form of (or is partly or fully constituted by) at least one layer (or film, or element, in particular of polymer, for example polyvinyl chloride (PVC), etc.) applied onto the surface of the vitroceramic (for example adhesively bonded onto the lower face) and/or onto the surface of an element (such as a waveguide and/or a light source, etc.), associated or combined with the vitroceramic (for example, the diffusing element being deposited on the light source, or encapsulating said light source), and/or differential treatment or texturing of the relevant surface of the vitroceramic (or of an associated or combined element), for example by chemical attack (acid, etc.) or mechanical attack (sandblasting, etc.), etc.

This diffusing zone is, in particular, placed between the source and the zone to be illuminated, and is generally integral with the vitroceramic and/or optionally another associated or combined element. Optionally, the diffusing zone (or extraction means or surface) may alternatively or additionally be provided in the thickness of the vitroceramic (or of an associated or combined element), optionally, for example, by means of an internal laser etching technology, etc.

The article according to the invention also comprises at least one or more light sources (their number and their arrangement may be varied in order to homogenize the illumination). The source or sources may be integrated into/coupled with one or more structures of the display type (for example with light-emitting diodes, of the so-called "7 segment" type), or with an electronic control panel with sensitive buttons and a digital display, etc. As already mentioned, the light sources are advantageously formed by light-emitting diodes, more or less spaced apart, optionally combined with one or more optical guides, as mentioned below. Diodes are advantageous in the present invention particularly in terms of size, efficiency, lifetime and resistance to environmental conditions (heat, etc.).

The diodes may be encapsulated, that is to say they may comprise a semiconductor component and a package (for example of a resin of the epoxy or nylon or silicone type) encapsulating the semiconductor component. The diodes may also be semiconductor chips without collimating lenses, for example with a size of the order of one hundred μm or one mm, optionally with minimal (for example protective) encapsulation.

The diodes may be carried by a support or bar or base, in which case the base may have a (plane or inclined) treated surface and/or a surface rendered reflective for better luminous efficiency, for example coated with a lacquer or paint and/or mirror layer, and/or coupled with a white or metallic reflector in order to direct the emitted radiation better.

The assembly of the source or sources (with the plate or another constituent of the article, for example the control panel) may be carried out by welding, dip-fastening, adhesive bonding etc., optionally by means of another element; for example, diodes welded onto a support itself accommodated at the bottom of a profiled metal section, may be mounted by clip-fastening or adhesive bonding of the profiled section. The positioning of the source or sources (with respect to the plate, in particular) is adapted to allow display through the vitroceramic.

The sources, as well as their supply and actuation, may or may not be independent, in order to allow simultaneous or separate illumination of the desired illumination zones, according to requirements.

The light source or sources may be triggered by any control system, for example one or more electromagnetic push-buttons or by sensitive buttons, and in particular the light source or sources may be actuated according to a capacitive mechanism by placing a finger on the vitroceramic at the location of (or on) the suitable activation zone, this activation zone being indicated on the surface of the vitroceramic and corresponding, in particular, to the aforementioned luminous zone (intended to be illuminated) according to the invention. The touch of the finger (conductor of electricity) modifies the capacitance, electrical charges being transferred thereto, the change in capacitance being detected by measurement systems, and the latter triggering in particular activation of the associated light source or sources.

As already mentioned, besides the source or sources, the article may comprise at least one waveguide intended to propagate the light from one part of the article to another (in particular by total internal reflection or by metallic reflection), the light source then being attached to the guide and cooperating therewith by emitting its light radiation therein so that the guide transmits this light, the light source or sources emitting/being coupled for example via the side or edge of the guide. This guide is advantageously clear or transparent, and is generally attached (assembled after having been designed separately) onto the lower face of the substrate. It may be organic and/or plastic (for example made of polycarbonate or polymethyl methacrylate PMMA), or inorganic, and is preferably inorganic; in particular, it is a glass. The article according to the invention may comprise a plurality of guides, each dedicated to one or more luminous zones, or a unitary guide, optionally provided with openings. The guide may be secured to the substrate by adhesive bonding and/or clip-fastening, or by encapsulation, etc. The assembly of the guide may be carried out directly on the substrate or another part of the article, or a support on which the article is mounted, and for example the guide may be secured to the casing of a cooking appliance on which the substrate is mounted (in which case the casing may optionally form part of the article). The guide makes it possible, inter alia, to guide the light better toward the desired illumination zones, in particular when the substrate has a dark color. Optionally, the geometry and the roughness of the edge of a waveguide may also be configured in order to permit controlled local extraction of the light.

The article according to the invention may advantageously be a cooking plate, or a vitroceramic article having a display or at least one luminous zone of functional or decorative nature, or an article or module or an assembly or system (mainly intended) for display (decorative and/or functional).

The term "vitroceramic articles" is intended to mean not only articles made of vitroceramic (or glass-ceramic) per se but also articles made of any other similar material suitable for the same applications (for example an optionally reinforced glass), in particular resistant to high temperature and/or having in particular a zero or quasi-zero expansion coefficient (for example less than $15.10^{-7}$ K$^{-1}$, as in the case of vitroceramic plates used in radiant rings). Preferably, however, it is an article made of vitroceramic per se.

Preferably, the article according to the invention is formed (as substrate) by a vitroceramic plate (generally with a thickness of between 3 and 4 mm, in particular of the order of 4 mm) which is plane, or mainly or substantially plane (in particular with a curvature of less than 0.1%, and preferably of the order of zero, of the diagonal of the plate) and is intended to be used as a cooking plate. Such a plate is generally intended to be integrated into a cooking or kitchen top comprising said plate and heating elements, for example radiant or halogen heat sources or induction heating elements.

The plate generally has an "upper" face (visible face) at the position of use, another, "lower" face (often concealed, in the framework or casing of a cooker, for example) at the position of use, and a side (or edge or thickness). The upper face is generally plane and smooth, but may also have at least one zone in relief and/or at least one zone in depression and/or at least one opening (for example if the plate incorporates an opening intended to receive an atmospheric gas burner). The lower face may, in particular, be smooth or provided with points increasing its mechanical strength and obtained, for example, by rolling. Optionally, in the case of points, an index resin may be applied onto the lower surface in order to smooth it, if necessary.

In one embodiment of the invention, the luminous zone mentioned according to the invention lies within a relief of one or more elevations and/or preferably depressions, particularly (with sizes) such as to allow location of said zone by touch, the relief being for example in the form of one or more geometrical patterns. This type of relief can be produced by grinding or polishing the vitroceramic, or without it being necessary to carry out a specific additional step by adapting the geometry of the support or the molding or pressing surfaces which the plates must match. The feature of touch location is easily obtained by an expedient selection of the geometry of the relief. In order to ensure touch location under optimal conditions, the height of the relief may for example be at least equal to 0.1 mm, preferably at least 0.2 mm, this height not exceeding for example 2 mm, and in particular being less than 1 mm. The "height" of the relief is intended to mean its size in the direction perpendicular to the plane of the plate, that is to say the level difference between its highest point and its lowest point.

According to an advantageous embodiment, the surroundings of the location relief on the plate have an essentially smooth surface condition, from which said relief constitutes a continuous variation. The plate may be shaped, particularly in the relevant zone, by an operation of indentation, molding or pressing, with the use of a support or molding or pressing surfaces having the desired geometry, in which case the indentation, molding or pressing may be carried out at any time in a conventional method of manufacturing a vitroceramic plate, so long as the material of which it is made is at a temperature high enough to allow plastic deformation.

The article according to the invention is, in particular, based on any vitroceramic intrinsically having a luminous transmission ranging from 0.8% to 40%, preferably from 0.8 to 5%, in particular from 0.8 to 2%, and an optical transmission (determined in the known way by taking the ratio between the transmitted intensity and the incident intensity at a given wavelength) of at least 3.5% for a wavelength of 625 nm lying in the visible range. The term "intrinsically" is intended to mean that the plate itself exhibits such transmission without the presence of any coating. The luminous transmission is measured according to the standard ISO 9050:2003 (also mentioning the optical transmission) by using the illuminant D65, and is the total transmission (in particular integrated over the visible range and weighted with the sensitivity curve of the human eye), taking into account both the direct transmission and the possible diffuse transmission, the measurement being carried out for example with the aid of a spectrophotometer provided with an integrating sphere, the measurement with a given thickness subsequently being converted if necessary to the reference thickness of 4 mm according to the standard ISO 9050:2003.

The invention applies particularly advantageously to dark plates, particularly with a black or brown appearance, having such transmission criteria, although the vitroceramic used having such criteria may also be a clear vitroceramic, the solution according to the invention being adapted for this range of plates simply and without risk of degrading other properties of the plates.

The article according to the invention may optionally include elements and/or layers other than the aforementioned constituents. In the case of a cooking module, for example, the article may be provided with (or associated with) one or more additional functional or decorative elements (frame, one or more connectors, one or more cables, one or more control elements), etc. It may comprise various functional and/or decorative coatings based on enamel, paint etc. For example, one of the faces of the substrate may have a layer of at least one other enamel, for example for decoration or for masking (for example in order to avoid direct visibility of the sources), etc.

The invention also relates to appliances (or devices) for cooking and/or for maintaining at high temperature, having at least one article according to the invention (for example cookers, fitted cooking tops, ovens, etc.) and optionally having one or more heating elements such as one or more radiant or halogen elements and/or one or more atmospheric gas burners and/or one or more induction heating means. The article according to the invention may also constitute a cooking appliance having one or more heating elements further to the elements mentioned above in the definition of the invention. The invention equally well includes cooking appliances having a single plate and appliances having a plurality of plates, each of these plates optionally having a single ring or multiple rings. The term "ring" is intended to mean a cooking position. The invention also relates to hybrid cooking appliances, the cooking plate or plates of which have a plurality of types of rings (gas rings, radiant, halogen or induction rings).

Besides the internal heating elements, the cooking appliance generally also comprises control and/or monitoring means, the internal elements being covered by the vitroceramic substrate, and the display or the luminous zone or zones being seen through said substrate.

The enamel coating and the diffusing zone may be added to the vitroceramic substrate, depending on the case, before and/or after ceramization of the precursor glass (or mother glass or green glass) in order to obtain the vitroceramic substrate. As a reminder, vitroceramic plates are generally manufactured as follows: in a melting furnace, the glass with the selected composition is melted in order to form the vitroceramic, then the molten glass is rolled into a standard ribbon or sheet by passing the molten glass between rolls, and the glass ribbon is cut to the desired dimensions. The plates cut in this way are subsequently ceramized in a manner known per se, the ceramization consisting in firing the plates according to the selected thermal profile in order to convert the glass into the polycrystalline material referred to as "vitroceramic", the expansion coefficient of which is zero or quasi-zero and which withstands a thermal stress ranging up to 700° C. The ceramization generally comprises a step of progressively raising the temperature to the nucleation range, generally lying in the vicinity of the transition range of the glass, and a step of passing through the nucleation interval in a few minutes, further progressive raising of the temperature to the temperature of the ceramization level, maintaining the temperature of the ceramization level for a few minutes then rapid cooling to room temperature. Optionally, the method also comprises a cutting operation (generally before ceramization), for example with a water jet, mechanical tracing with a wheel, etc., followed by a dressing operation (grinding, beveling, etc.).

The enamel used according to the invention allows deposition in as few passes as possible over a small thickness, which makes it possible to avoid flaking of the enamel and mechanical damage to the vitroceramic plate. The substrate is generally coated by screen printing on its upper face in the suitable zone or zones with a paste comprising the composition with the aid of screen-printing screens (for example composed of polyester or polyamide filament fabrics), either before ceramization or after ceramization, then dried at around 100-150° C.

Advantageously, the substrate coated with the selected enamel (obtained after firing) has an opacity such that it makes it possible in particular to mask underlying elements. The opacity is evaluated by measuring (reflection colorimetry carried out with the aid of a Byk-Gardner Color Guide 45/0 colorimeter) the color variation $\Delta E^*$, corresponding to the difference between the color measured on the opposite face of the substrate from the face carrying the enamel for the substrate placed on an opaque white background and that for the substrate placed on an opaque black background ($\Delta E^* = ((L_w^* - L_B^*)^2 + (a_w^* - a_B^*)^2 + (b_w^* - b_B^*)^2)^{1/2}$ according to the formula established in 1976 by the CIE, $L_w^*$, $a_w^*$, $b_w^*$ being the colorimetric coordinates of the first measurement on the white background and $L_B^*$, $a_B^*$, $b_B^*$ being those of the second measurement on the black background). Advantageously, the vitroceramic substrate coated with the enamel according to the invention has a value of $\Delta E^*$ less than or equal to 0.5, preferably less than or equal to 0.4, in particular less than 0.1. Furthermore, the enamel used advantageously has a value of $L^*$ less than 25, or less than 21, and preferably between 12 and 18, this value expressing an absence of porosity of the enamel on the glass substrate.

Preferably, the article according to the invention comprises at least one luminous zone intended to indicate whether at least one heating zone is on or off (referred to as an ON/OFF zone, the uncovered region defining the pattern to be illuminated in said zone being, for example, in the form of an icon indicating the on state). The article according to the invention also preferably comprises an enamel as defined according to the invention, deposited, for example by screen printing, on the upper phase in said zone, this enameled coating being for example in the form of a disk, at the center of which an uncovered region is formed according to the selected pattern (such as the aforementioned ON/OFF pattern). This pattern indicates, for example, that it is an ON/OFF control button, located for example on the control panel, the activation of this button being carried out for example according to a capacitive mechanism by placing a finger on the vitroceramic on said button. The activation thereof lights an LED emitting light (for example of red color). The light emitted by this LED is diffused by means of the diffusing zone located above the light source, this zone having for example a cylindrical shape (or circular or disk-shaped, the diameter corresponding for example to that of the disk screen-printed onto the upper face). This diffusing disk is, for example, adhesively bonded onto the lower face of the vitroceramic. When the light of the LED is diffused below the screen-printed ON/OFF circle, the red light appears in the uncovered zone.

The present invention and its advantages will be better understood on reading the following example, given solely by way of example and without limitation.

EXAMPLE ACCORDING TO THE INVENTION

In this example, the article produced is a flat cooking module comprising a translucent black vitroceramic plate (substrate) marketed under the reference KeraBlack+ or KeraVision by the company Eurokera, this plate having a smooth upper face and a smooth lower face, the article furthermore comprising a light source fixed below and against the plate.

The light source used is a light-emitting diode (LED) marketed under the reference AlInGaP 5 mm Avago LED diode by the company Avago, positioned below the plate. Furthermore, on the upper face of the plate, in the control panel and in line with the light source, an enamel is deposited which is composed of 50% glass frit with the following composition: $SiO_2$: 47.6%; $Al_2O_3$: 5.0%; $Li_2O$: 3.6%; $B_2O_3$: 40%; $Na_2O$: 2.5%; $K_2O$: 1.4%, and composed of 50% by weight of black pigments (based on chromium-copper spinels) marketed under the reference V7709 by the company Ferro, the thickness of the enamel deposited being between 2.5 and 5 μm. This deposition is carried out in the shape of a disk, and an uncovered region in the form of an icon indicating activation is formed in this enameled deposit with the aid of corresponding masks in the screen-printing screen used for the deposition. The pattern created indicates that it is a control zone (ON/OFF zone), the activation of this zone being carried out according to a capacitive mechanism.

Furthermore, a pellet of polyvinyl chloride (PVC) with a thickness of 5 mm is used as the diffusing zone, which is adhesively bonded below the vitroceramic or on the light source (this source may optionally be encapsulated in the PVC).

The mother glass plate decorated in this way is subsequently ceramized by carrying out rapid heating to 650° C., then heating to about 820° C. at a heating rate of about 15° C./min, then heating to the maximum crystallization temperature (between 900 and 950° C., approximately) at a heating rate of a few degrees per minute, holding at this latter temperature for a few minutes, then cooling in the oven, the firing of the enamel taking place during the ceramization. After ceramization and firing of the enamels, the light of the ON/OFF control button LED located below the vitroceramic at the position of the ON/OFF pattern diffuses only into the uncovered zone, allowing satisfactory definition of the ON/OFF pattern.

REFERENCE EXAMPLE

The aforementioned enamel is replaced with an enamel composed of 70% glass frit with the following composition: $SiO_2$: 41.7%; $Al_2O_3$: 18.5%; $Li_2O$: 2.1%; $B_2O_3$: 28.0%; $Na_2O$: 0.9%; $K_2O$: 3.5%, CaO: 2.8%, and composed of 30% by weight of black pigments based on CoSi marketed by the company Ferro under the reference 220946. After ceramization and firing of the enamels, the light of the ON/OFF control button LED located below the vitroceramic at the position of the ON/OFF pattern diffuses into the enamel, preventing satisfactory definition of the ON/OFF pattern. Furthermore, the frit used has a softening point (590° C.) which is too high compared with that of the frit of the example according to the invention (515° C.), the pigment content which can be associated with this frit being limited at the risk of obtaining an enamel which does not allow good layering on the surface of the vitroceramic.

The articles, in particular plates, according to the invention may in particular be used advantageously to produce a new range of cooking plates for cookers or cooking tops.

The invention claimed is:

1. A vitroceramic article comprising at least one luminous zone comprising at least one luminous pattern, said article comprising:
   at least one vitroceramic substrate:
   at least one light source;
   at least one enamel coating which covers at least a part of the luminous zone and within which an uncovered region is formed in the shape of the luminous pattern; and
   a diffusing zone facing the enamel coating,
   wherein:
   the composition of the enamel comprises at least one glass fit and at least one pigment;
   the glass frit comprises

| | |
|---|---|
| $SiO_2$ | 40-55%, |
| $Al_2O_3$ | 0-10%, |
| $B_2O_3$ | 25-55%, |
| $Na_2O$ | 0-5%, |
| $K_2O$ | 0-5%, and |
| $Li_2O$ | 0-10%; and | a proportion of the pigment ranges from 40 to 65% by weight of the glass frit and the pigment.

2. The vitroceramic article of claim 1, wherein the glass fit consists of:

| | |
|---|---|
| $SiO_2$ | 45-50%; |
| $Al_2O_3$ | 3-6%; |
| $B_2O_3$ | 27-45%; |
| $Na_2O$ | 2-3%; |
| $K_2O$ | 1-2%; and |
| $Li_2O$ | 3-5%. |

3. The vitroceramic article of claim 1, wherein the enamel coating is deposited on one face of the substrate, the diffusing zone being on the opposite face of the substrate and being approximately of the same shape, size, or both, as the enamel coating.

4. The vitroceramic article of claim 1, wherein the light source is actuated according to a capacitive mechanism by placing a finger on the vitroceramic substrate at a location of a suitable activation zone, this activation zone being indicated on the surface of the vitroceramic substrate and corresponding to the luminous zone.

5. The vitroceramic article of claim 1, wherein the luminous zone lies within a relief of one or more elevations, depressions, or both.

6. The vitroceramic article of claim 1, comprising a substrate having a luminous transmission ranging from 0.8% to 40%, and an optical transmission of at least 3.5% for a wavelength of 625 nm.

7. The vitroceramic article of claim 1, wherein the article or the substrate is a cooking plate.

8. The vitroceramic article of claim 1, comprising a luminous zone adapted to indicate whether at least one heating zone is on or off, the diffusing zone being located above the light source.

9. The article of claim 1, comprising one or more heating elements.

10. The article of claim 1, which is adapted to cover or receive heating elements.

11. The article of claim 2, wherein the enamel coating is deposited on an upper face of the substrate.

12. The vitroceramic article of claim 1, comprising a substrate having a luminous transmission ranging from 0.8% to 5%, and an optical transmission of at least 3.5% for a wavelength of 625 nm.

13. The vitroceramic article of claim 1, comprising a substrate having a luminous transmission ranging from 0.8% to 2%, and an optical transmission of at least 3.5% for a wavelength of 625 nm.

14. The vitroceramic article of claim 8, wherein the enamel coating is in the form of a disk, at the center of which an uncovered region is formed according to a pattern indicating that it is a control button, the activation of this button being carried out for example according to a capacitive mechanism by placing a finger on said button.

15. The vitroceramic article of claim 8, wherein the diffusing zone has a circular shape corresponding to that of a screen-printed coating.

16. The vitroceramic article of claim 1, wherein the luminous zone lies in such a way that it allows location of said zone by touch, the relief being for example in the form of one or more geometrical patterns.

17. The vitroceramic article of claim 16, wherein the relief is in the form of one or more geometrical patterns.

* * * * *